(12) United States Patent
Hwang et al.

(10) Patent No.: US 10,712,853 B2
(45) Date of Patent: Jul. 14, 2020

(54) DISPLAY DEVICE INCLUDING TOUCH SENSORS AND METHOD OF DRIVING THE SAME

(71) Applicant: LG Display Co., Ltd., Seoul (KR)

(72) Inventors: KwangJo Hwang, Paju-si (KR); Taeyun Kim, Paju-si (KR); Sangkyu Kim, Paju-si (KR); Ruda Rhe, Seoul (KR); DeukSu Lee, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/156,853

(22) Filed: Oct. 10, 2018

(65) Prior Publication Data

US 2019/0129565 A1    May 2, 2019

(30) Foreign Application Priority Data

Oct. 27, 2017    (KR) .......................... 10-2017-0141563

(51) Int. Cl.
*G06F 3/041* (2006.01)
*G06F 3/044* (2006.01)
*G09G 3/3233* (2016.01)

(52) U.S. Cl.
CPC .......... *G06F 3/0412* (2013.01); *G06F 3/0418* (2013.01); *G06F 3/0443* (2019.05); *G06F 3/0446* (2019.05); *G06F 3/041662* (2019.05); *G09G 3/3233* (2013.01); *G09G 2310/066* (2013.01); *G09G 2310/08* (2013.01); *G09G 2330/021* (2013.01); *G09G 2354/00* (2013.01)

(58) Field of Classification Search
CPC .... G06F 3/0412; G06F 3/0418; G06F 3/0443; G06F 3/0446; G06F 3/041662; G06F 3/3233; G09G 2310/066; G09G 2310/08; G09G 2354/00; G09G 2330/021
See application file for complete search history.

(56) References Cited

U.S. PATENT DOCUMENTS

2016/0241139 A1* 8/2016 Yao ...................... G06F 1/3262
2017/0250605 A1* 8/2017 Park ..................... G09G 3/3233

* cited by examiner

*Primary Examiner* — Liliana Cerullo
(74) *Attorney, Agent, or Firm* — Fenwick & West LLP

(57) ABSTRACT

A power supply and a method of driving the same. A converter receives an input voltage from a battery and outputs a first voltage through an output terminal, such that a ground voltage of the output terminal changes. A pulse width modulation (PWM) controller controls the converter to adjust the voltage level of the first voltage. The ground voltage is applied to the converter as a direct current (DC) voltage during a first time and as a pulse wave having a predetermined amplitude during a second time. The PWM controller controls the first voltage to have different voltage levels during the first time and the second time.

10 Claims, 17 Drawing Sheets

DISPLAY DEVICE INCLUDING TOUCH SENSORS AND METHOD OF DRIVING THE SAME

CROSS-REFERENCE TO RELATED APPLICATION

This application claims priority to Republic of Korea Patent Application No. 10-2017-0141563 filed on Oct. 27, 2017, which is hereby incorporated by reference in its entirety.

BACKGROUND

Field of Technology

The present disclosure relates to a display device including touch sensors and a method of driving the same.

Description of Related Art

In response to the development of the information society, demand for a variety of display devices for displaying images is increasing. In this regard, a range of display devices, such as liquid crystal display (LCD) devices, plasma display devices, and organic light-emitting diode (OLED) display devices, have come into widespread use.

In addition, display devices can operate in response to instructions input by users using a variety of user interfaces or input devices, such as a keyboard and a mouse. Touchscreen panels allowing users to intuitively and conventionally input instructions to display devices by touching screens have also been developed as input systems of display devices. A touchscreen panel is disposed on the screen of a display device to receive an instruction input by a user when the user touches a specific point on the screen of the display device. Since the touchscreen panel determines touch coordinates, the touchscreen panel may be referred to as a touch sensing unit.

Such a display device may be provided with a touchscreen panel mounted thereon. When the touchscreen panel is disposed on the display device, electrical lines of the touchscreen panel may be adjacent to electrical lines of the display device, thereby increasing the level of parasitic capacitance occurring between the touch panel and the display device, which is problematic.

BRIEF SUMMARY

Various aspects of the present disclosure provide a display device including touch sensors for reducing power consumption and a method of driving the same.

Also provided are a display device, including a touch sensing unit mounted thereon, and a method of driving the same.

According to an aspect of the present disclosure, a power supply may include: a converter receiving an input voltage from a battery and outputting a first voltage through an output terminal, such that a ground voltage of the output terminal changes; and a pulse width modulation (PWM) controller controlling the converter to adjust a voltage level of the first voltage. The ground voltage is applied to the converter as a direct current (DC) voltage during a first time and as a pulse wave having a predetermined amplitude during a second time. The PWM controller controls the first voltage to have different voltage levels during the first time and the second time.

According to another aspect of the present disclosure, a display device may include: a display panel; a touch sensing unit disposed on the display panel; and a power supply supplying power to the display panel and the touch sensing unit. The power supply may include: a converter receiving an input voltage from a battery and outputting a first voltage through an output terminal, such that a ground voltage of the output terminal changes; and a PWM controller controlling the converter to adjust a voltage level of the first voltage. The ground voltage is applied to the converter as a DC voltage during a first time and as a pulse wave having a predetermined amplitude during a second time. The PWM controller controls the first voltage to have different voltage levels during the first time and the second time.

According to another aspect of the present disclosure, a display device may include: a display panel operating by receiving a first voltage and a second voltage having a lower voltage level than a voltage level of the first voltage, wherein the display panel operates during a first time and stops operations during a second time; a touch sensing unit stops operations during the first time while operating during the second time; and a power supply supplying the first voltage and the second voltage to the display panel, the voltage level of the first voltage and the voltage level of the second voltage corresponding to a touch driving signal supplied to the touch sensing unit.

According to another aspect of the present disclosure, provided is a method of driving a display device including a touch sensing unit and displaying an image by receiving a first voltage and a second voltage. The method may include: supplying the first voltage and the second voltage as DC voltages during a display time in which the touch sensing unit does not operate; and supplying the first voltage and the second voltage as alternating current (AC) voltages during a touch sensing time in which the touch sensing unit operates. A voltage level of the first voltage supplied as the AC voltage is higher than a voltage level of the first voltage supplied as the DC voltage.

According to exemplary embodiments, provided are a display device including touch sensors for reducing power consumption and a method of driving the same.

According to exemplary embodiments, provided are a display device, including a touch sensing unit mounted thereon, and a method of driving the same.

BRIEF DESCRIPTION

The above and other objects, features, and advantages of the present disclosure will be more clearly understood from the following detailed description when taken in conjunction with the accompanying drawings, in which.

DETAILED DESCRIPTION

Figure 1:
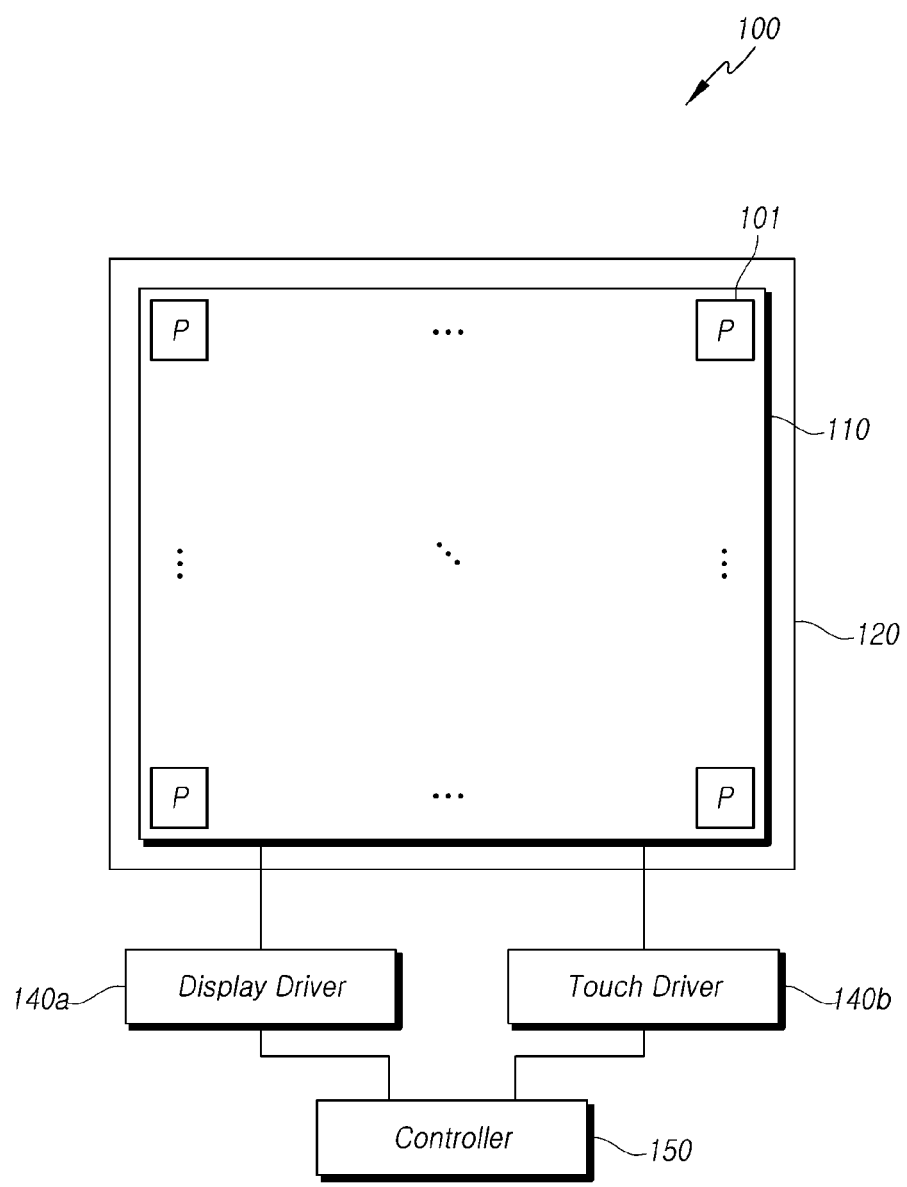
FIG. 1 is a conceptual view illustrating a configuration of a display device according to exemplary embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are merely used to distinguish one element from other elements. The substance, sequence, order, or number of such elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. FIG. 1 is a conceptual view illustrating a configuration of a display device according to exemplary embodiments.

Referring to FIG. 1, the display device 100 includes a display panel 110, a touch sensing unit 120, a display driver 140a, a touch driver 140b, and a controller 150.

The display panel 110 may include a plurality of pixels 101 arranged in the form of a matrix. Each of the pixels may include an organic light-emitting diode (OLED) and a pixel circuit (not shown) supplying a driving current to the OLED. In response to a gate signal, the pixel circuit can generate a driving current by receiving a data signal and supply the driving current to the OLED. In addition, the display panel 110 can be driven by a plurality of voltages transferred thereto. The plurality of voltages, delivered to the display panel 110, may include a first voltage EVDD and a second voltage EVSS having a lower level than the first voltage EVDD. The first voltage EVDD and the second voltage EVSS may cause driving current to flow through the display panel 110. The first voltage EVDD may be a voltage supplied to the display panel according to columns (or rows) of pixels, while the second voltage may be a voltage commonly supplied to the plurality of pixels 101.

The touch sensing unit 120 may be disposed on the display panel 110, and can sense a touch performed by a user using a stylus. The term "touch" used herein may mean not only a direct touch, but also an approach to a position within a predetermined distance.

The display driver 140a can transfer a gate signal and a data signal to the display panel 110. The display driver 140a can generate a data signal by receiving an image signal. Although a single display driver 140a is illustrated for the sake of brevity, the present disclosure is not limited thereto, and the number of display drivers may be determined depending on the size or resolution of the display panel 110. The display driver 140a may be implemented as an integrated circuit (IC).

The touch driver 140b can transfer a touch driving signal to the touch sensing unit 120 and receive a touch sensing signal, generated in response to the touch driving signal. The touch driver 140b may be implemented as an IC.

The controller 150 can control each of the display driver 140a and the touch driver 140b. In addition, the controller 150 can supply an image signal to the display driver 140a.

Figure 2:
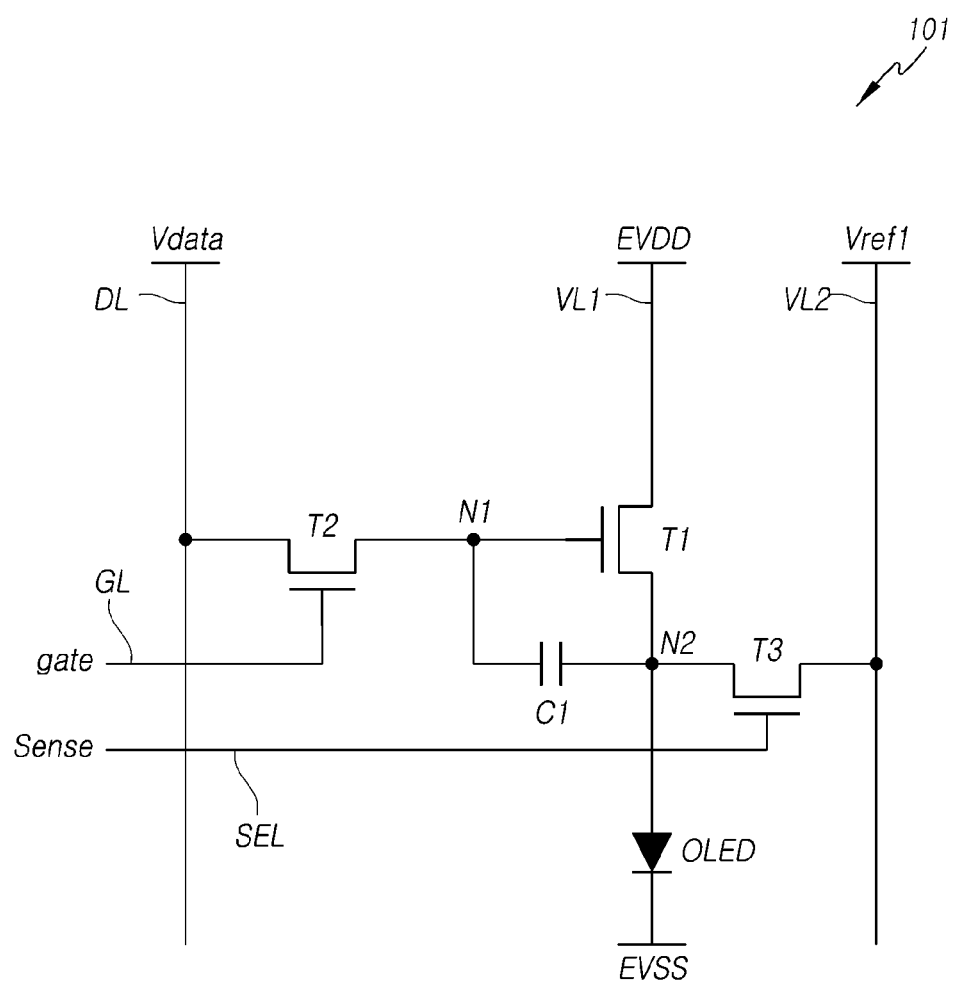
FIG. 2 is a circuit diagram illustrating a pixel according to exemplary embodiments.

FIG. 2 is a circuit diagram illustrating a pixel according to exemplary embodiments.

Referring to FIG. 2, the pixel 101 may include a pixel circuit including an OLED, first to third transistors T1 to T3, and a capacitor C1. The first transistor T1 may be a driving transistor supplying driving current to the OLED.

The first transistor T1 may have a first electrode connected to a first voltage line VL1 to receive a first voltage EVDD through the first voltage line VL1, a second electrode connected to a second node N2, and a gate electrode connected to a first node N1. The second transistor T2 may have a first electrode connected to a data line DL, a second electrode connected to the first node N1, and a gate electrode connected to a gate line GL. In addition, the third transistor T3 may have a first electrode connected to the second node N2, a second electrode connected to a second voltage line VL2, and a third electrode connected to a sensing control signal line SEL. The sensing control signal line SEL may be the gate line GL. The OLED may have an anode connected to the second node N2 and a cathode to which a second voltage EVSS is transferred. The cathode may be connected to the second voltage line VL2. Accordingly, driving current supplied through the first transistor T1 can flow through the OLED. In addition, the capacitor C1 may be connected between the first node N1 and the second node N2 to maintain a voltage applied to the first node N1. The first voltage EVDD may be transferred to the first voltage line VL1, while a first reference voltage Vref1 may be transferred to the second voltage line VL2.

Figure 3:
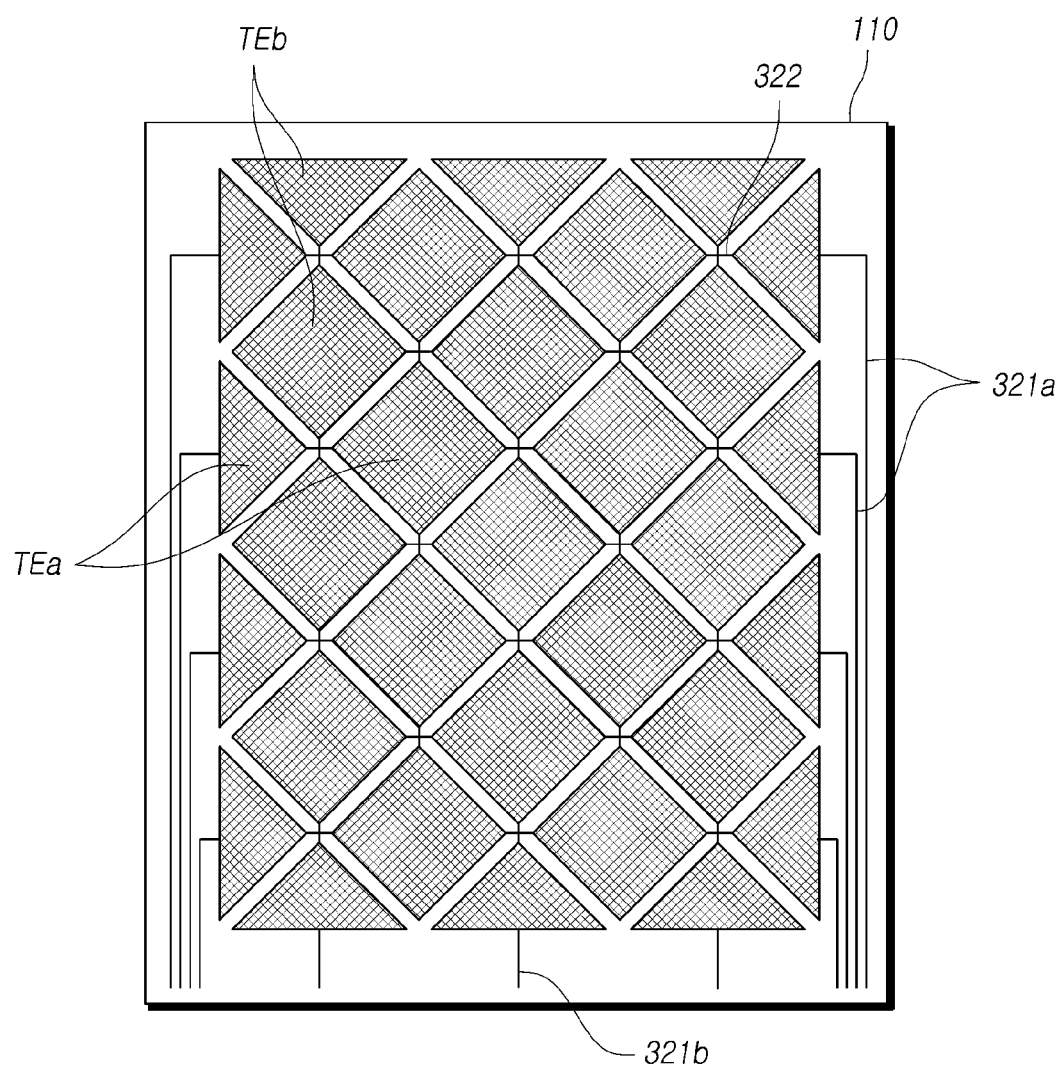
FIG. 3 is a plan view illustrating an exemplary touch sensing unit used in the display device according to exemplary embodiments.

FIG. 3 is a plan view illustrating an exemplary touch sensing unit used in the display device according to exemplary embodiments.

Referring to FIG. 3, the sensing circuit may be disposed on the display panel 110, and include a plurality of first electrodes TEa and a plurality of second electrodes TEb. Each of the plurality of first electrodes TEa may be a touch driving electrode, while each of the plurality of second electrodes TEb may be a touch sensing electrode. The plurality of first electrodes TEa may be connected by connectors 322 in row directions, thereby providing a plurality of electrode rows, while the plurality of second electrodes TEb may be connected by connectors 322 in column directions, thereby providing a plurality of electrode columns. Although the plurality of first electrodes TEa and the plurality of second electrodes TEb are illustrated as being arranged in a 4×3 matrix, the present disclosure is not limited thereto.

The first electrodes TEa can receive a touch driving signal transferred thereto, while the second electrodes TEb can transfer touch sensing signals in response to the touch driving signal. Although the first electrodes TEa and the second electrodes TEb may be provided on the same layer on the display panel 110, the present disclosure is not limited thereto.

The connectors 322 connect the first electrodes TEa to each other. In addition, the connectors 322 connect the second electrodes TEb to each other. The connectors 322 are disposed to intersect each other. To prevent the first electrodes TEa from being directly connected to the second electrodes TEb, the connectors 322, connecting the first electrodes TEa, may be provided on a different layer from the first electrodes TEa and the second electrodes TEb, and may be connected to the first electrodes TEa through electrical vias. The connectors 322, connecting the second electrodes TEb, may be provided on the same layer as the first electrodes TEa and the second electrodes TEb to connect the second electrodes TEb. Accordingly, an insulating film (not shown) may be disposed between the connectors 322, connecting the first electrodes TEa, and the connectors 322, connecting the second electrodes TEb.

The first electrodes TEa and the second electrodes TEb may be provided by patterning a conductive metal layer. The first electrodes TEa and the second electrodes TEb may be made of a transparent material, such as indium tin oxide (ITO). When patterned, each of the first and second electrodes TEa and TEb may have a mesh-shaped electrode pattern. Each of the first and second electrodes TEa and TEb may have a plurality of open areas. Light, generated by the display device, can be emitted outwardly by passing through the first and second electrodes TEa and TEb, provided as ITO electrodes, or through the plurality of open areas of the first and second electrodes TEa and TEb.

The mesh-shaped patterns of the first electrodes TEa and the second electrodes TEb may be referred to as touch electrode lines. The first electrodes TEa and the second electrodes TEb may be connected to driving lines 321a, through which a driving signal is applied to the touch electrodes, and sensing lines 321b, through which sensing signals generated in response to a touch sensed by the touch electrodes are transferred. The driving lines 321a and the sensing lines 321b may be referred to as touch lines. The touch lines, including the driving lines 321a and the sensing lines 321b, may be connected to the pads disposed in pad areas 300, as illustrated in FIG. 1.

Figure 4:
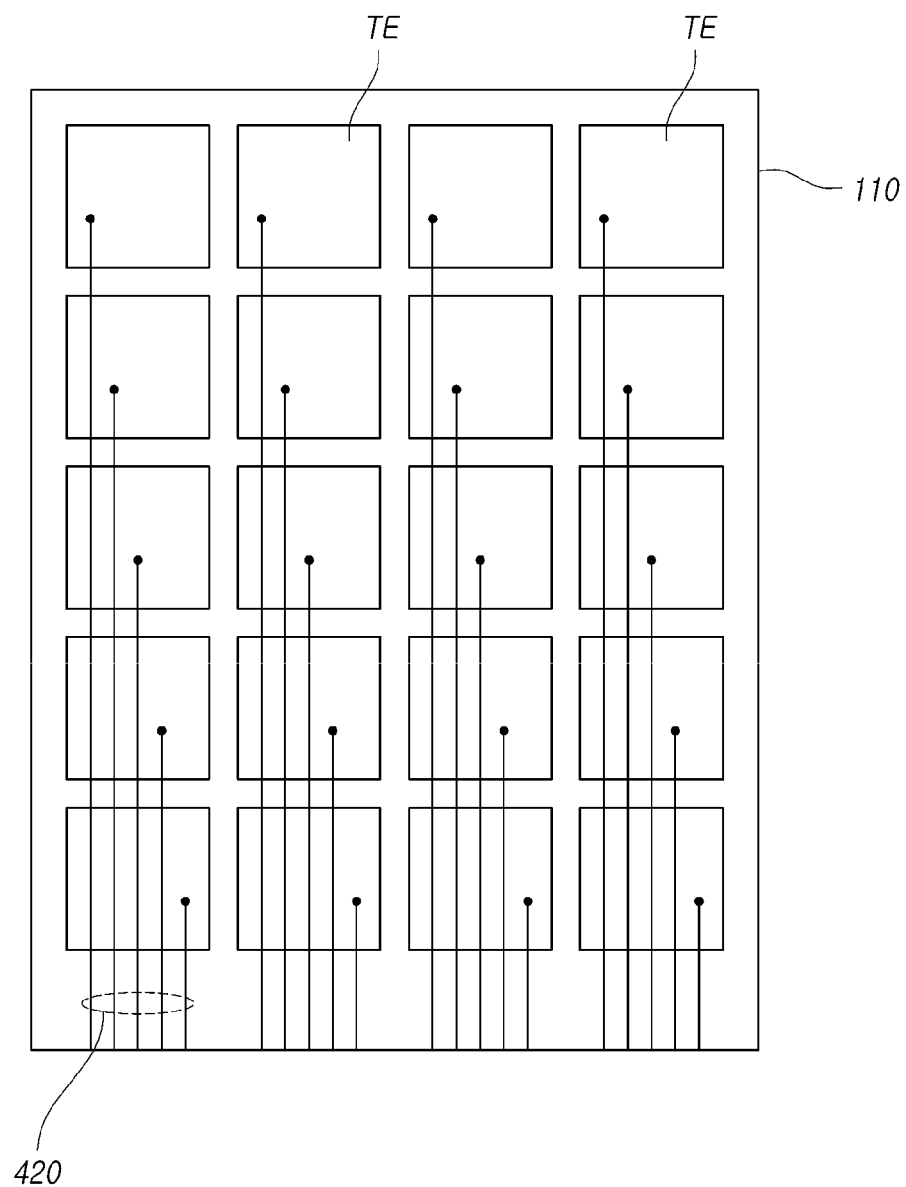
FIG. 4 is a plan view illustrating another exemplary touch sensing unit used in the display device according to exemplary embodiments.

FIG. 4 is a plan view illustrating another exemplary touch sensing unit used in the display device according to exemplary embodiments.

Referring to FIG. 4, the touch sensing unit may be provided with a plurality of touch electrodes TE having predetermined areas. The plurality of touch electrodes TE may be arranged in the form of a matrix on the display panel 110. A plurality of touch lines 420 may be connected to the touch electrodes TE, respectively, to receive touch sensing signals therefrom. The touch lines 420 may be disposed below the touch electrodes TE to be in contact with predetermined portions of the touch electrodes TE. Since the touch electrodes TE and the touch lines 420 may be disposed within the display panel 110, it is not required for the display device to include a separate touchscreen panel disposed on the display panel 110. Consequently, the display panel 110 can be designed to be thin.

Figure 5:
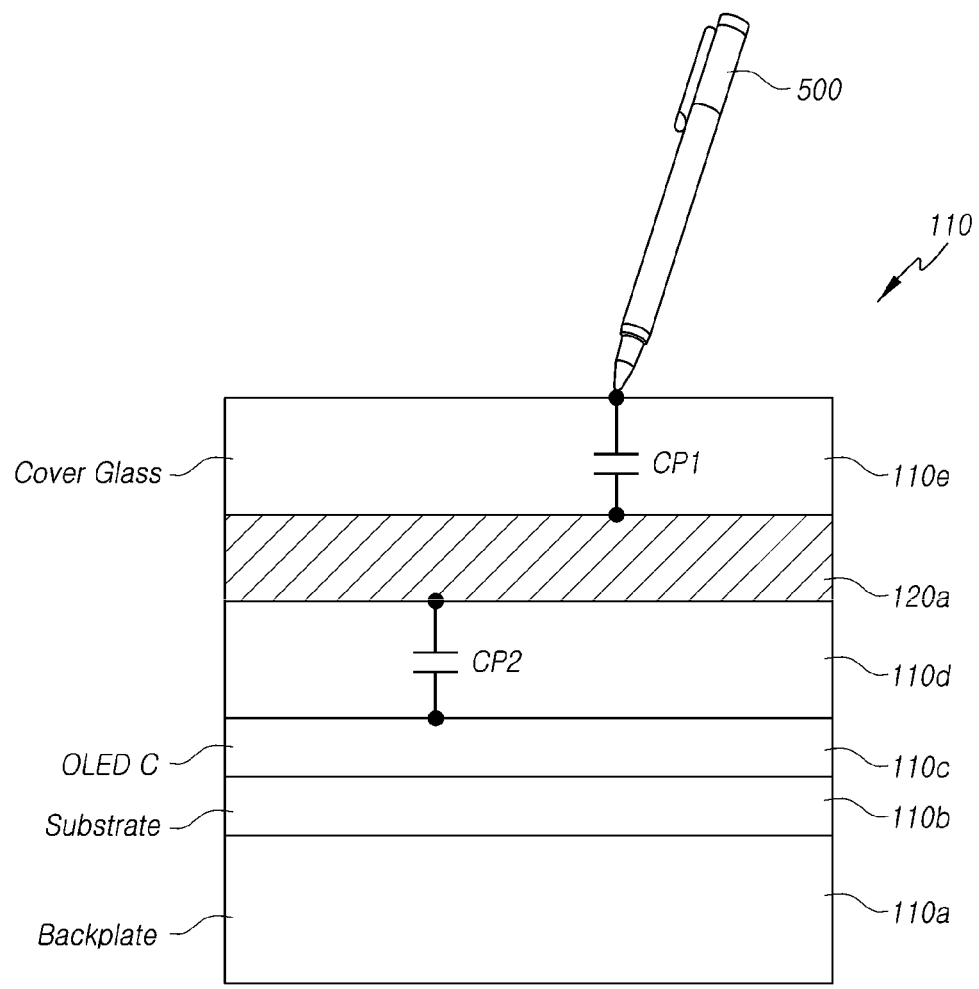
FIG. 5 is a cross-sectional view illustrating the display device according to exemplary embodiments.

FIG. 5 is a cross-sectional view illustrating the display device according to exemplary embodiments.

Referring to FIG. 5, the display device 100 may include a display panel 110 and a touch sensing unit 120a. The display panel 110 includes: a backplate 110a; a substrate 110b on which gate lines, data lines, and transistors are disposed; a light-emitting layer 110c including organic light-emitting diodes (OLEDs) disposed on the substrate 110b; and a sealing substrate 110d sealing the light-emitting layer 110c. The touch sensing unit 120a is provided on top of the sealing substrate 110d. A cover glass pane 110e may be provided in a top portion of the display panel 110, on top of the touch sensing unit 120a. The light-emitting layer 110c may include an anode, a cathode, and an organic light-emitting film disposed between the anode and the cathode. The configuration of the display device 100 is not limited thereto.

The display panel 110 may operate separately according to a display time and a touch sensing time. The display panel 110 may operate to display images during the display time, while the touch sensing unit 120a may operate to determine a touch position during the touch sensing time. The touch sensing unit 120 may operate based on the self-capacitance sensing during the touch sensing time. The self-capacitance sensing may be a method of sensing a touch using parasitic capacitance. Specifically, when a user touches the cover glass pane 110e using a stylus pen, a touch can be sensed using parasitic capacitance CP1 generated between the stylus pen and the touch sensing unit 120.

The light-emitting layer 110c, disposed below the touch sensing unit 120a, contains a conductor, and can maintain a constant voltage in the touch sensing time. In the self-capacitance sensing, parasitic capacitance CP2 may also be generated between the touch sensing unit 120a and the light-emitting layer 110c.

The parasitic capacitance CP2, generated between the touch sensing unit 120a and the light-emitting layer 110c, may increase power consumption. In addition, the parasitic capacitance CP2 may reduce the accuracy of touch sensing. It is therefore necessary to reduce the magnitude of the parasitic capacitance CP2.

An alternating current (AC) voltage may be applied to the cathode of the light-emitting layer 110c to reduce the magnitude of the parasitic capacitance CP2. Since a touch driving signal for driving the touch sensing unit 120 is transferred as an AC signal, when the voltage applied to the cathode is also an AC voltage, the parasitic capacitance CP2 can be generated with a smaller magnitude. When a touch driving signal is supplied to the touch electrodes, a direct current (DC) voltage can be applied to the cathode during the display time, whereas an AC voltage can be applied to the cathode during the touch sensing time. The voltage level of the DC voltage applied to the cathode may be 0V.

In addition, the touch sensing unit 120a may operate based on the mutual-capacitance sensing. According to the mutual-capacitance sensing, in a case in which capacitance is generated between first electrodes TEa and second electrodes TEb as illustrated in FIG. 3, when a user touches a cover glass pane using a stylus pen, a touch can be sensed based on a change in capacitance between touch driving electrodes and touch sensing electrodes. When the touch sensing unit operates based on the mutual-capacitance sensing, a second reference voltage applied thereto may be a DC voltage.

Although the cover glass pane is illustrated as being touched using the stylus pen, the present disclosure is not limited thereto.

Figure 6:
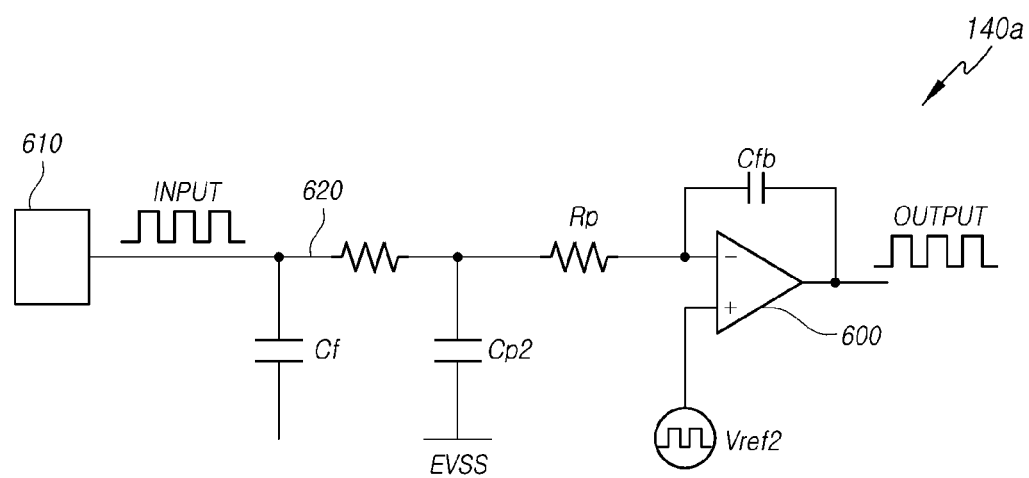
FIG. 6 is a circuit diagram illustrating an exemplary structure of the touch driver according to exemplary embodiments.

FIG. 6 is a circuit diagram illustrating an exemplary structure of the touch driver according to exemplary embodiments.

Referring to FIG. 6, the touch driver 140a may include an amplifier 600 receiving a second reference voltage Vref2 via a first input end (+), transferring the received second reference voltage Vref2 to a touch electrode 610 via a second input terminal (−), and receiving a touch driving signal INPUT via a second input terminal (−). The amplifier 600 may form an integrator together with a feedback capacitor Cfb. An output signal of the integrator may be a touch sensing signal, which can be used to determine a touch. The second reference voltage Vref2 may be provided as an AC voltage. The second reference voltage Vref2 may be a touch driving signal. When the second reference voltage Vref2 is input to the first input terminal (+), the second reference voltage Vref2 can be transferred to the touch electrode 610 via a touch line 620. In addition, the touch electrode 610 can transfer a touch driving signal INPUT to the second input terminal (−) of the amplifier 600 via the touch line 620. The amplifier 600 can store signals, transferred via the first input terminal (+) and the second input terminal (−), in a feedback capacitor Cfb and output a sensing signal OUTPUT.

The touch driver 140a, having the above-described configuration, allows parasitic capacitance CP2 to be generated between the touch line 620 and a cathode EVSS of a light-emitting layer. When the voltage, applied to the cathode EVSS, is an AC voltage, the capacity of the parasitic capacitance CP2, generated between the touch line 620 and the cathode EVSS, may be reduced.

Figure 7:
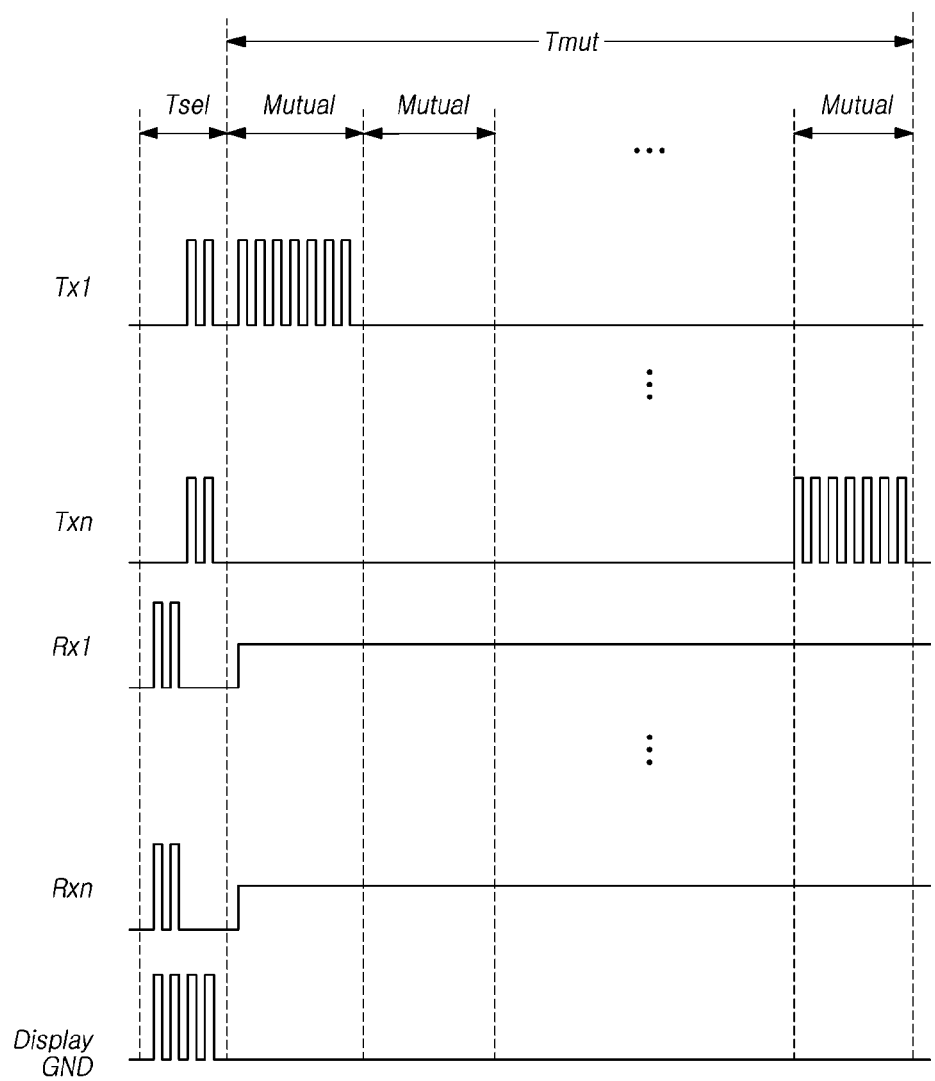
FIG. 7 is a timing diagram illustrating signals input to a touch sensing unit, in the display device according to exemplary embodiments, during a touch sensing time.

FIG. 7 is a timing diagram illustrating signals input to a touch sensing unit, in the display device according to exemplary embodiments, during a touch sensing time.

Referring to FIG. 7, the touch sensing time may include a first touch time Tsel in which the touch sensing unit senses a touch position based on the self-capacitance touching and a second touch time Tmut in which the touch sensing unit locates the touch position based on the mutual-capacitance touching.

The touch sensing unit may include the touch sensors illustrated in FIG. 3. In the case in which the touch sensing unit senses a touch based on the self-capacitance sensing, the touch sensors illustrated in FIG. 4 may be used.

First, a touch driving signal may simultaneously be transferred to a plurality of touch sensing lines Rx1, . . . , and Rxm in the first touch time Tsel. Afterwards, a touch driving signal may be simultaneously transferred to a plurality of touch driving lines Tx1, . . . , and Txn. In the first touch time Tsel, when the touch driving signal is transferred to the touch sensing lines Rx1, . . . , and Rxm, a touch can be sensed using capacitance values between the touch sensing lines Rx1, . . . , and Rxm and the stylus pen. In addition, in the first touch time Tsel, when the touch driving signal is transferred to the touch driving lines Tx1, . . . , and Txn, a touch can be sensed using capacitance values between the touch driving lines Tx1, . . . , and Txn and the stylus pen.

A touch driving signal may be transferred through the touch driving lines Tx1, . . . , and Txn in the second touch time Tmut. In the second touch time Tmut, touch sensing signals may be transferred through the touch sensing lines Rx1, . . . , and Rxm.

In the first touch time Tsel, an AC voltage having a predetermined frequency may be supplied to a ground GND. In the second touch time Tmut, a DC voltage may be supplied to the ground GND. Herein, the AC or DC voltage supplied to the ground GND may also be referred to as a ground voltage. The AC voltage, supplied to the ground GND, may be a pulse wave including a plurality of pulses. The DC voltage may be a voltage having a voltage level of 0. However, the present disclosure is not limited thereto. The AC voltage may be a second reference voltage Vref2.

Figure 8:
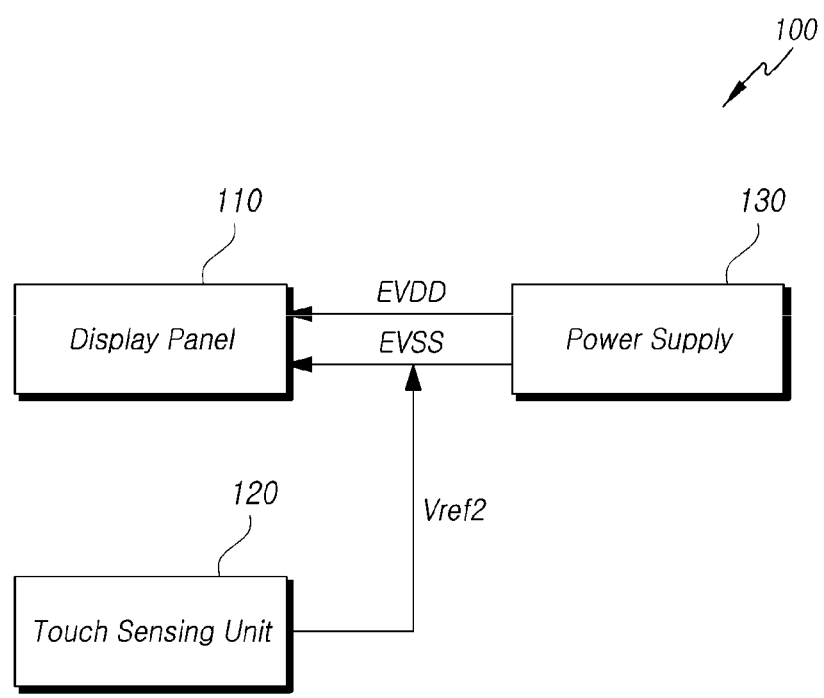
FIG. 8 is a block diagram illustrating a configuration the display device according to exemplary embodiments.

FIG. 8 is a block diagram illustrating a configuration the display device according to exemplary embodiments.

Referring to FIG. 8, the display device 100 may include a display panel 110, a touch sensing unit 120, and a power supply 130. The display panel 110 operates by receiving a first voltage EVDD and a second voltage EVSS having a lower voltage level than the first voltage EVDD. The display panel 110 operates during a first time and stops operations during a second time. The touch sensing unit 120 stops operations during the first time and operates during the second time. The power supply 130 supplies the first voltage EVDD and the second voltage EVSS to the display panel 110. The voltage level of the first voltage and the voltage level of the second voltage correspond to that of a second reference voltage Vref supplied to the touch sensing unit 120. The first time may be a display time, while the second time may be a touch sensing time. The first time may be a time period, among the display time and the touch sensing time, in which the touch sensing unit 120 senses a touch based on mutual-capacitance sensing, while the second time may be a time period, among the touch sensing time, in which the touch sensing unit 120 senses a touch based on self-capacitance sensing. The display panel 110 can receive the first voltage EVDD and the second voltage EVSS, and a current can flow through the display panel 110 in response to a data signal. Even in the case in which the first voltage EVDD and the second voltage EVSS are transferred as AC signals in response to a touch driving signal during the second time, an image displayed on the display panel 110 is not distorted, since both the voltage levels of the first voltage EVDD and the second voltage EVSS change simultaneously.

Figure 9:
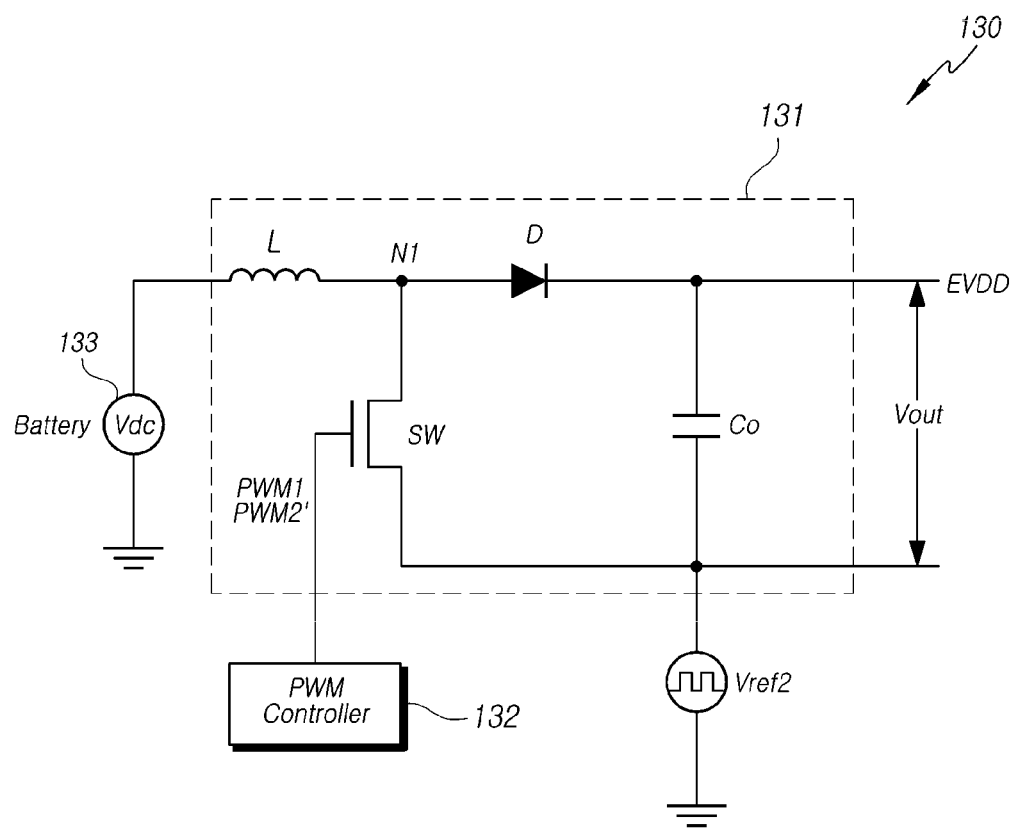
FIG. 9 illustrates an exemplary structure of the power supply according to exemplary embodiments.

FIG. 9 illustrates an exemplary structure of the power supply according to exemplary embodiments.

Referring to FIG. 9, the power supply 130 may include an inductor L connected to a battery 133 to receive electric current supplied from the battery 133, a diode D connected to the inductor L, and a converter 131 including a switch SW. The switch SW has a first electrode connected to a first node N1 between the inductor L and the diode D, a second electrode connected to a ground, and a gate electrode receiving a pulse width modulation (PWM) signal. The power supply 130 may further include a PWM controller 132 transferring a PWM signal to the gate electrode. The converter 131 can output a first voltage EVDD through an output terminal Vout including an output capacitor Co. In addition, a second reference voltage Vref2 may be transferred to the ground.

In the power supply 130 configured as above, when the switch SW repeatedly turns on and off in response to the PWM signal, the direction of current flowing through the inductor L may be changed by turning the switch SW on and off. Consequently, a voltage may be applied to the inductor L. The diode D can cause current to flow in a clockwise direction. The output terminal Vout can output a first voltage EVDD. When a second reference voltage Vref2 is transferred to the ground, the first voltage EVDD can be output as an AC voltage, corresponding to the second reference voltage Vref2.

In addition, the PWM controller 132 can output a first PWM signal during a display time while outputting a second PWM signal during a touch sensing time. The first PWM signal and the second PWM signal have different duty ratios.

Since the level of an output voltage can be adjusted differently, due to the duty ratio of the PWM signal, the power supply 130 can output the first voltage at different voltage levels during the display time and the touch sensing time.

Figure 10:
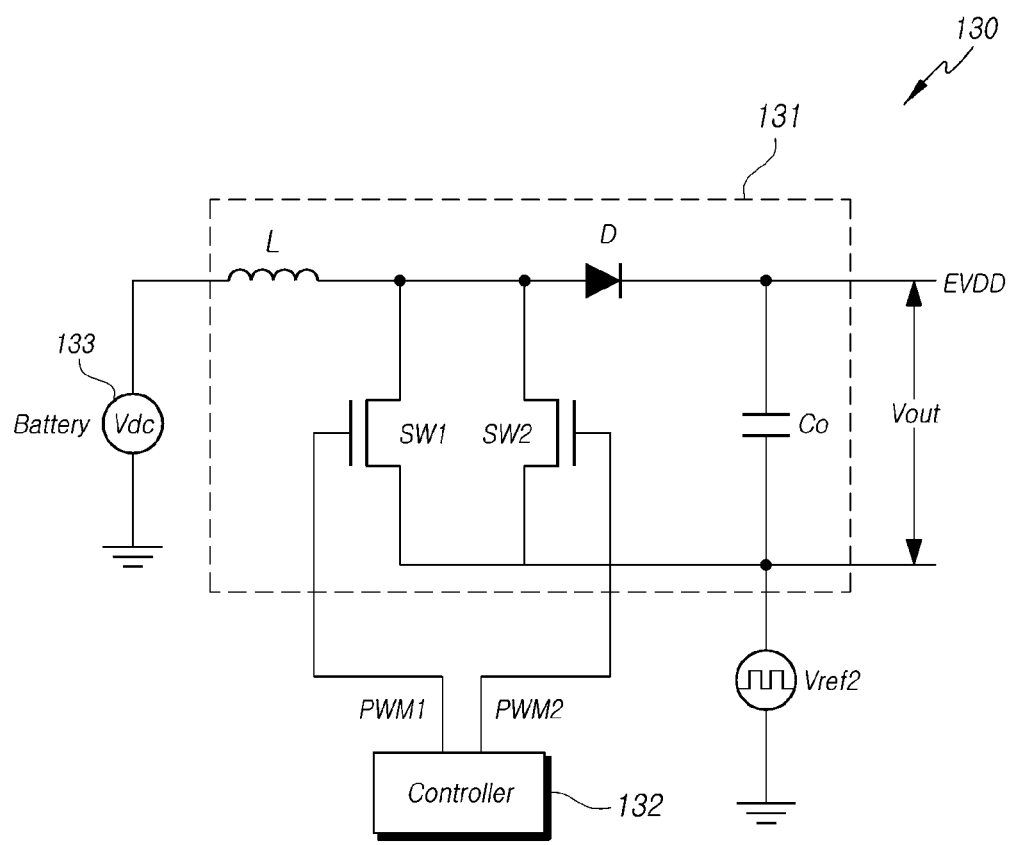
FIG. 10 illustrates another exemplary structure of the power supply according to exemplary embodiments.

FIG. 10 illustrates another exemplary structure of the power supply according to exemplary embodiments.

Referring to FIG. 10, the power supply 130 may include an inductor L connected to a battery 133 to receive electric current supplied from the battery 133, a diode D connected to the inductor L, and a converter 131 including a first switch SW1 and a second switch SW2. The first switch SW1 has a first electrode connected to a first node N1 between the inductor L and the diode D, a second electrode connected to a ground, and a gate electrode receiving a first PWM signal. The second switch SW2 has a first electrode connected to the first node N1, a second electrode connected to the ground, and a gate electrode receiving a second PWM signal PWM2. The power supply 130 may further include a PWM controller 132 transferring the first PWM signal PWM1 and the second PWM signal PWM2 to the gate electrode. The converter 131 can output a first voltage EVDD through an output terminal Vout including an output capacitor Co. In addition, a second reference voltage Vref2 may be transferred to the ground.

In the power supply 130 configured as above, when the first switch SW1 or the second switch SW2 repeatedly turns on and off in response to the first PWM signal PWM1 or the second PWM signal PWM2, the direction of current flowing through the inductor L may be changed by turning the switch SW1 or SW2 on and off. Consequently, a voltage may be applied to the inductor L. The output terminal Vout can output a first voltage EVDD. Since the first switch SW1 and the second switch SW2 are turned on and off by the first PWM signal PWM1 and the second PWM signal PWM2 having different duty ratios, the first voltage EVDD, output by the power supply 130, may have different voltage levels. The diode D can cause current to flow in a clockwise direction. When a second reference voltage Vref2 is transferred to the ground, the first voltage EVDD can be output as an AC voltage, corresponding to the second reference voltage Vref2. Since the cathodes of the display panel 110 may be connected to the ground, an AC voltage corresponding to the second reference voltage Vref2 can be applied to the cathodes.

In addition, the PWM controller 132 can output a first PWM signal PWM1 during a display time while outputting a second PWM signal PWM2 during a touch sensing time. The first PWM signal PWM1 and the second PWM signal PWM2 have different duty ratios. Since the level of an output voltage can be adjusted differently, due to the duty ratio of the PWM signal, the power supply 130 can output the first voltage at different voltage levels during the display time and the touch sensing time. In addition, the first switch SW1 may be activated during the display time, while the second switch SW2 may be activated during the touch sensing time. However, the present disclosure is not limited thereto.

Figure 11:
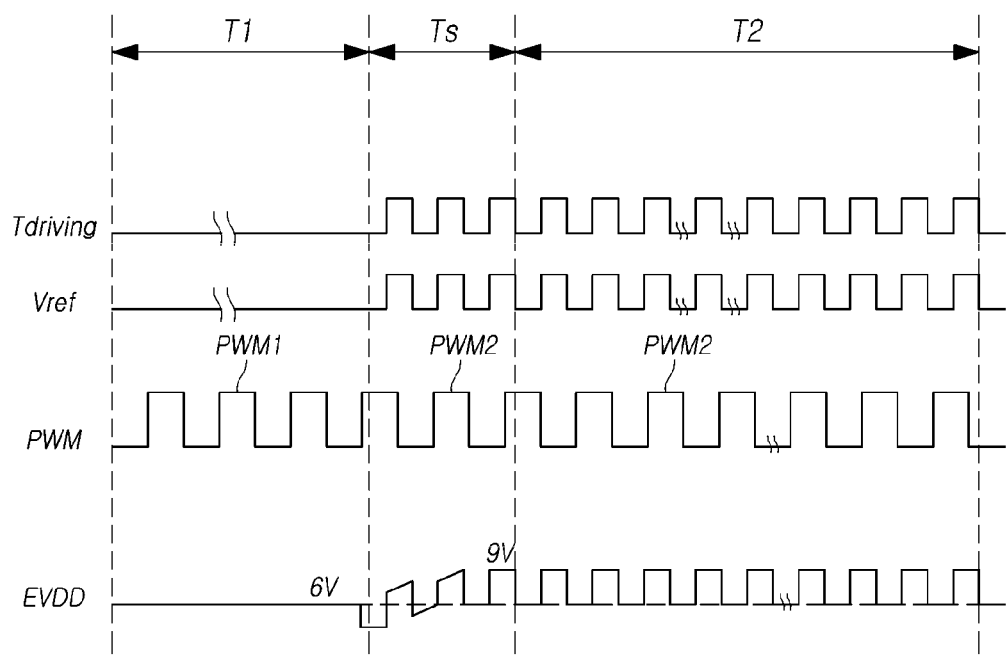
FIG. 11 is a timing diagram illustrating signals supplied to a power supply according to exemplary embodiments.
Figure 12:
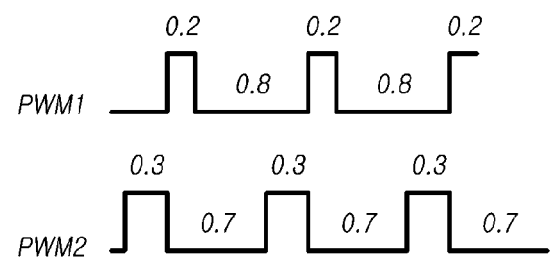
FIG. 12 is a timing diagram illustrating duty ratios of PWM signals.

FIG. 11 is a timing diagram illustrating signals supplied to a power supply according to exemplary embodiments, and FIG. 12 is a timing diagram illustrating duty ratios of pulse width modulation (PWM) signals.

Referring to FIGS. 11 and 12, in a display time T1, a second reference voltage Vref2 is not input. Thus, a touch driving signal may not be input from the touch electrode. The PWM controller 132 can output a PWM signal during the display time T1. The output PWM signal may be a first PWM signal PWM1.

At the start of a touch sensing time T2, a second reference voltage Vref2 and a touch driving signal may be input. The touch driving signal may correspond to the second reference voltage Vref2. The PWM controller 132 can output a PWM signal during the touch sensing time. The output PWM signal may be a second PWM signal PWM2.

The first PWM signal PWM1 and the second PWM signal PWM2 may be output from different output terminals of the PWM controller 132. Alternatively, the first PWM signal PWM1 and the second PWM signal PWM2 may be output from the same output terminal or be output by being time-divided.

Since the voltage level of the first voltage output from the converter 131 by the PWM controller 132 is not directly raised, a setting time Ts may be present between the display time T1 and the touch sensing time T2.

In addition, the first PWM signal PWM1 may have an on-time length of 0.2 and an off-time length of 0.8. The second PWM signal PWM2 may have an on-time length of 0.3 and an off-time length of 0.7. However, the time lengths are not limited thereto, and the on-time length of the second PWM signal PWM2 may be set to be longer than the on-time length of the first PWM signal PWM1.

Accordingly, the voltage levels of a first voltage EVDD and a second voltage EVSS generated by the first PWM signal PWM1 may be different from the voltage levels of a first voltage EVDD and a second voltage EVSS generated by the second PWM signal PWM2. In addition, the voltage levels of the first voltage EVDD and the second voltage EVSS generated by the second PWM signal PWM2 may be higher than the voltage levels of the first voltage EVDD and the second voltage EVSS generated by the first PWM signal PWM1.

Figure 13A:
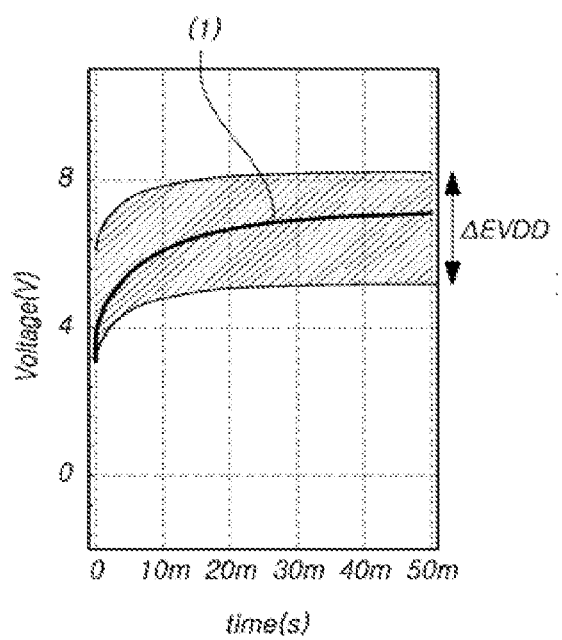
FIGS. 13A and 13B are graphs illustrating wavelengths of a first voltage output during a touch sensing time.
Figure 13B:
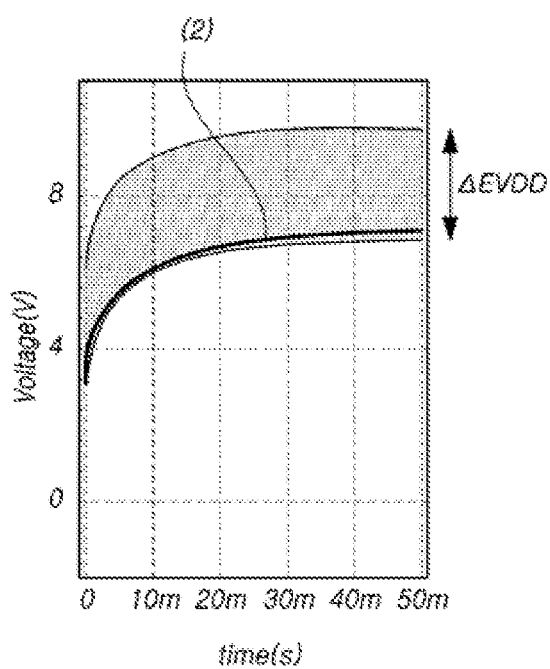

FIGS. 13A and 13B are graphs illustrating wavelengths of a first voltage output during a touch sensing time.

Referring to FIGS. 13A and 13B, FIG. 13A illustrates a voltage width ΔEVDD of a first voltage output in response to a first PWM signal during the touch sensing time, while FIG. 13B illustrates a voltage width ΔEVDD of a first voltage output in response to a second PWM signal during the touch sensing time. Curve 1 and curve 2 in FIGS. 13A and 13B indicate voltage levels of first voltages output during a display time. That is, the voltage width ΔEVDD of the first voltage, output in response to the first PWM signal, can have upper and lower limits of the first voltage EVDD output during the display time. It is appreciated that the voltage width ΔEVDD of the first voltage, output in response to the second PWM signal, is higher than the first voltage output during the display time.

Figure 14:
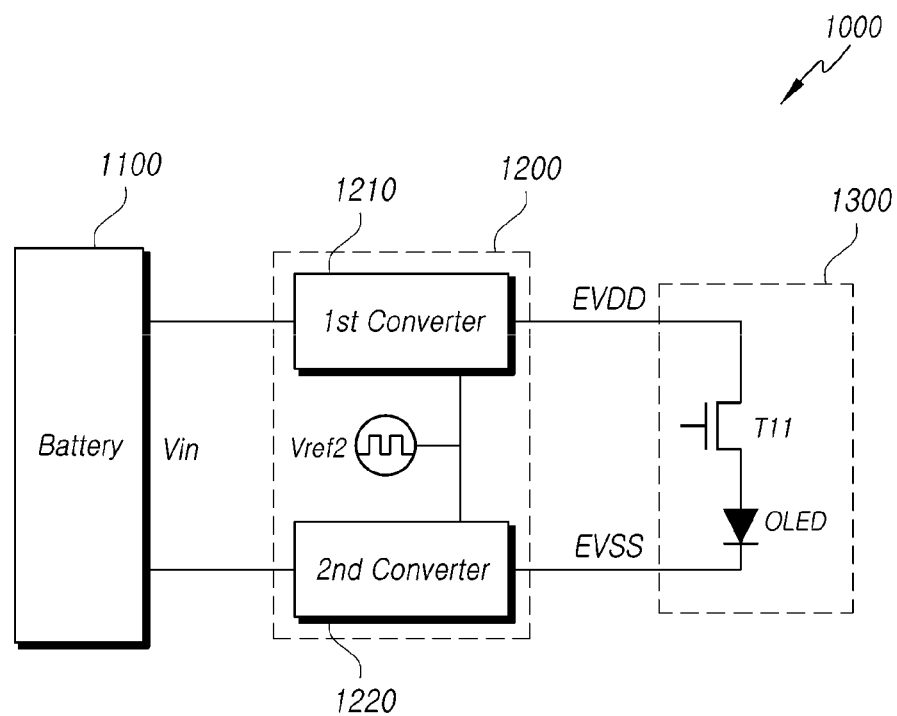
FIG. 14 illustrates another exemplary structure of the power supply according to exemplary embodiments.

FIG. 14 illustrates another exemplary structure of the power supply according to exemplary embodiments.

Referring to FIG. 14, the power supply 130 may include a first converter 131 and a second converter 131. The first converter 1210 can generate a first voltage EVDD by receiving an input voltage from a battery 1100. The second converter 1220 can generate a second voltage EVSS by receiving an input voltage Vin from the battery 1100. The first converter 1210 may be a boost converter, while the second converter 1220 may be an inverter. However, the present disclosure is not limited thereto.

A second reference voltage Vref2 may be transferred to a ground of the first converter 1210 and the second converter 1220. The second reference voltage Vref2 may be an AC voltage. The first voltage EVDD and the second voltage EVSS, generated by the power supply 130, may be supplied to a display panel 1300. A driving transistor T11 and an OLED of the display panel 1300 may be disposed between the first voltage EVDD and the second voltage EVSS.

Figure 15:
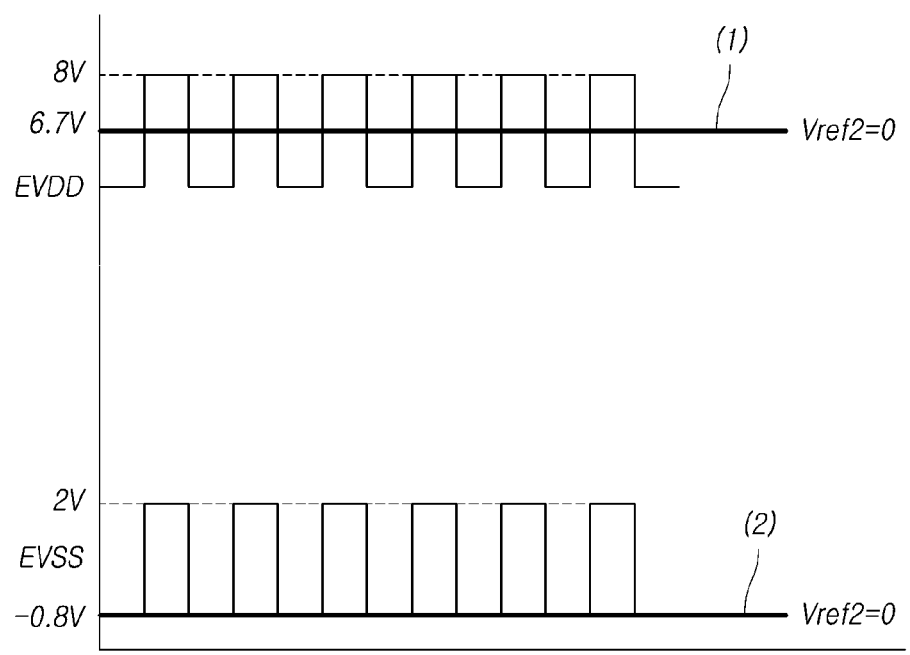
FIG. 15 is a graph illustrating voltages output by the power supply according to exemplary embodiments.

FIG. 15 is a graph illustrating voltages output by the power supply according to exemplary embodiments.

Referring to FIG. 15, a DC voltage may be applied to a ground during a display time. The DC current may be 0V. In addition, the DC voltage may be a second reference voltage Vref2, which is 0V. Line (1) indicates a first voltage EVDD when the second reference voltage Vref2 is 0V, while line (2) indicates a second voltage EVSS. The first converter 1210 can operate in response to a first PWM signal so that the first voltage EVDD is output at a voltage level of about 6.7V. The second converter 1220 can operate so that the second voltage EVSS is output at a voltage level of −0.8V.

In a touch sensing time, an AC voltage may be applied to the ground. The AC voltage may be a second reference voltage Vref2 applied to the touch driver, or may be a touch driving signal. The first converter 1210 and the second converter 1220 operate in response to a second PWM signal, so that the first voltage can be output at a voltage level of 5V to 8V, and the second voltage can be output at a voltage level of 0.8V to 2V.

Figure 16:
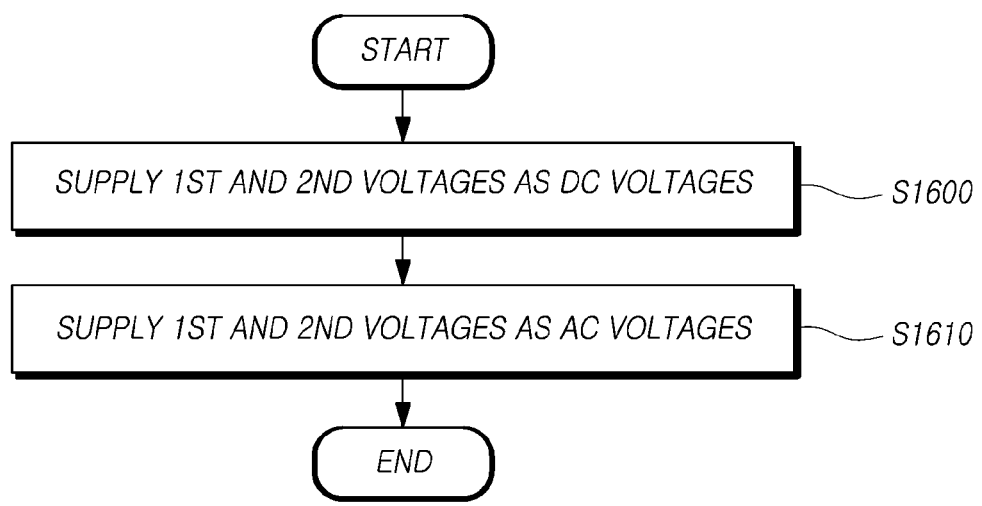
FIG. 16 is a flowchart illustrating a method of driving a display device according to exemplary embodiments.

FIG. 16 is a flowchart illustrating a method of driving a display device according to exemplary embodiments.

Referring to FIG. 16, in S1600, the display device displaying an image using the touch sensing unit 120, by receiving a first voltage EVDD and a second voltage EVSS, can supply the first voltage EVDD and the second voltage EVSS as DC voltages during a display time in which the touch sensing unit does not operate. During the display time, the display panel can receive the first voltage EVDD and the second voltage EVSS and display an image in response to driving currents corresponding to data signals.

The first voltage EVDD and the second voltage EVSS can be output using the converters, using voltages input from the battery. The converter outputting the first voltage EVDD may be a boost converter, while the converter outputting the second voltage EVSS may be an inverter. The converters are not limited thereto. A DC voltage may be connected to grounds of the converters. However, the present disclosure is not limited thereto. In addition, the converters can output the first voltage EVDD and the second voltage EVSS using a PWM signal. The voltage levels of the first voltage EVDD and the second voltage EVSS can be adjusted by controlling the duty ratios of the PWM signal. Since the touch sensing unit does not operate during the display time, it is not necessary to consider parasitic capacitance between the touch sensing unit and the display panel.

In S1600, during a touch sensing time in which the touch sensing unit operates, the first voltage EVDD and the second voltage EVSS can be supplied as AC voltages. When the second voltage EVSS is supplied as an AC voltage, the first voltage EVDD can also be output as an AC voltage. Although the operation of the display panel is stopped during the touch sensing time, an image can be displayed using a voltage stored in capacitors. When both the first voltage EVDD and the second voltage EVSS are AC voltages, no distortion will occur in the image. In addition, since the second voltage EVSS is supplied as an AC voltage, differences in the voltage between the touch lines, to which the touch driving signal is applied, and the cathodes of the display panel, to which the second voltage EVSS is applied, can be reduced, thereby reducing the magnitude of parasitic capacitance between the touch lines and the cathodes. This can consequently reduce power consumption. In addition, touch sensing can be prevented from being distorted.

When the second voltage EVSS, applied as an AC voltage, corresponds to the touch driving signal, the magnitude of parasitic capacitance can be further reduced. The second voltage EVSS corresponding to the touch driving signal may indicate that the frequency and/or amplitude thereof are the same as those of the touch driving signal. In addition, the touch driving signal may be applied to the cathodes to which the second voltage EVSS is supplied.

When the first voltage EVDD and the second voltage EVSS are supplied as AC voltages, the first voltage EVDD may be supplied at a higher voltage level than when supplied as a DC voltage, and the second voltage EVSS may be supplied at a lower voltage level than when supplied as a DC voltage. Here, the difference in the voltage levels in the first voltage EVDD may be compared based on maximum values, while the difference in voltage levels in the second voltage EVSS may be compared based on minimum values.

Even during the touch sensing time, the voltage levels of the first voltage EVDD and the second voltage EVSS may be adjusted using the PWM signal. In addition, the duty ratios of the PWM signal in the display time and the touch sensing time may be set differently. The on-time of the PWM signal in the touch sensing time may be set to be longer than the on-time of the PWM signal in the display time.

The foregoing descriptions and the accompanying drawings have been presented in order to explain the certain principles of the present disclosure. A person skilled in the art to which the present disclosure relates could make various modifications and variations by combining, dividing, substituting for, or changing the elements without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A power supply comprising:
    a converter comprising a first switch, the converter receiving an input voltage from a battery and outputting a first voltage through an output terminal, such that a ground voltage of the output terminal changes with respect to a reference voltage; and
    a pulse width modulation (PWM) controller controlling the converter to adjust a voltage level of the first voltage according to a PWM signal applied to the first switch,
    wherein the ground voltage is applied to the converter as a direct current (DC) voltage with respect to the reference voltage during a display mode of a display device during which an image is displayed on the display device and as a pulse wave having a predetermined amplitude with respect to the reference voltage during a touch sensing mode during which touch of the display device is sensed, and
    wherein the PWM controller controls the first voltage to have a first level during the display mode using a first duty ratio of the PWM signal, and controls the first voltage to have a second level during the touch sensing mode using a second duty ratio of the PWM signal that is different from the first duty ratio, the first level different from the second level.

2. The power supply according to claim 1, wherein the converter comprises an inductor connected to the first switch that repeatedly turns on and off in response to the PWM signal.

3. The power supply according to claim 1, wherein the converter comprises an inductor connected to the first switch that repeatedly turns on and off in response to the PWM signal, and connected to a second switch that repeatedly turns on and off in response to another PWM signal, the first switch being activated during the display mode, and the second switch being activated during the touch sensing mode.

4. The power supply according to claim 1, wherein the converter comprises a first converter outputting the first voltage and a second converter outputting a second voltage corresponding to the ground voltage.

5. The power supply of claim 1, wherein the first level of the first voltage is a direct current (DC) voltage and the second level of the second voltage alternates between different voltages.

6. A display device comprising:
   a display panel;
   a touch sensing unit disposed on the display panel; and
   a power supply supplying power to the display panel and the touch sensing unit, wherein the power supply comprises:
      a converter comprising a first switch, the converter receiving an input voltage from a battery and outputting a first voltage through an output terminal, such that a ground voltage of the output terminal changes with respect to a reference voltage; and
      a pulse width modulation (PWM) controller controlling the converter to adjust a voltage level of the first voltage according to a PWM signal applied to the first switch,
   wherein the ground voltage is applied to the converter as a direct current (DC) voltage with respect to the reference voltage during a display mode of a display device during which an image is displayed on the display device and as a pulse wave having a predetermined amplitude with respect to the reference voltage during a touch sensing mode during which touch of the display device is sensed, and
   wherein the PWM controller controls the first voltage to have a first level during the display mode using a first duty ratio of the PWM signal, and controls the first voltage to have a second level during the touch sensing mode using a second duty ratio of the PWM signal that is different from the first duty ratio, the first level different from the second level.

7. The display device according to claim 6, wherein the touch sensing unit does not operate during the display mode and operates during the touch sensing mode, by receiving a touch driving signal, the pulse wave corresponding to the touch driving signal.

8. The display device according to claim 6, wherein the converter comprises an inductor connected to the first switch that repeatedly turns on and off in response to the PWM signal.

9. The display device according to claim 6, wherein the converter comprises an inductor connected to the first switch that repeatedly turns on and off in response to the PWM signal, and connected to a second switch that repeatedly turns on and off in response to another PWM signal, the first switch being activated during the display mode, and the second switch being activated during the touch sensing mode.

10. The display device according to claim 6, wherein the converter comprises a first converter outputting the first voltage and a second converter outputting a second voltage corresponding to the ground voltage.

* * * * *